UNITED STATES PATENT OFFICE.

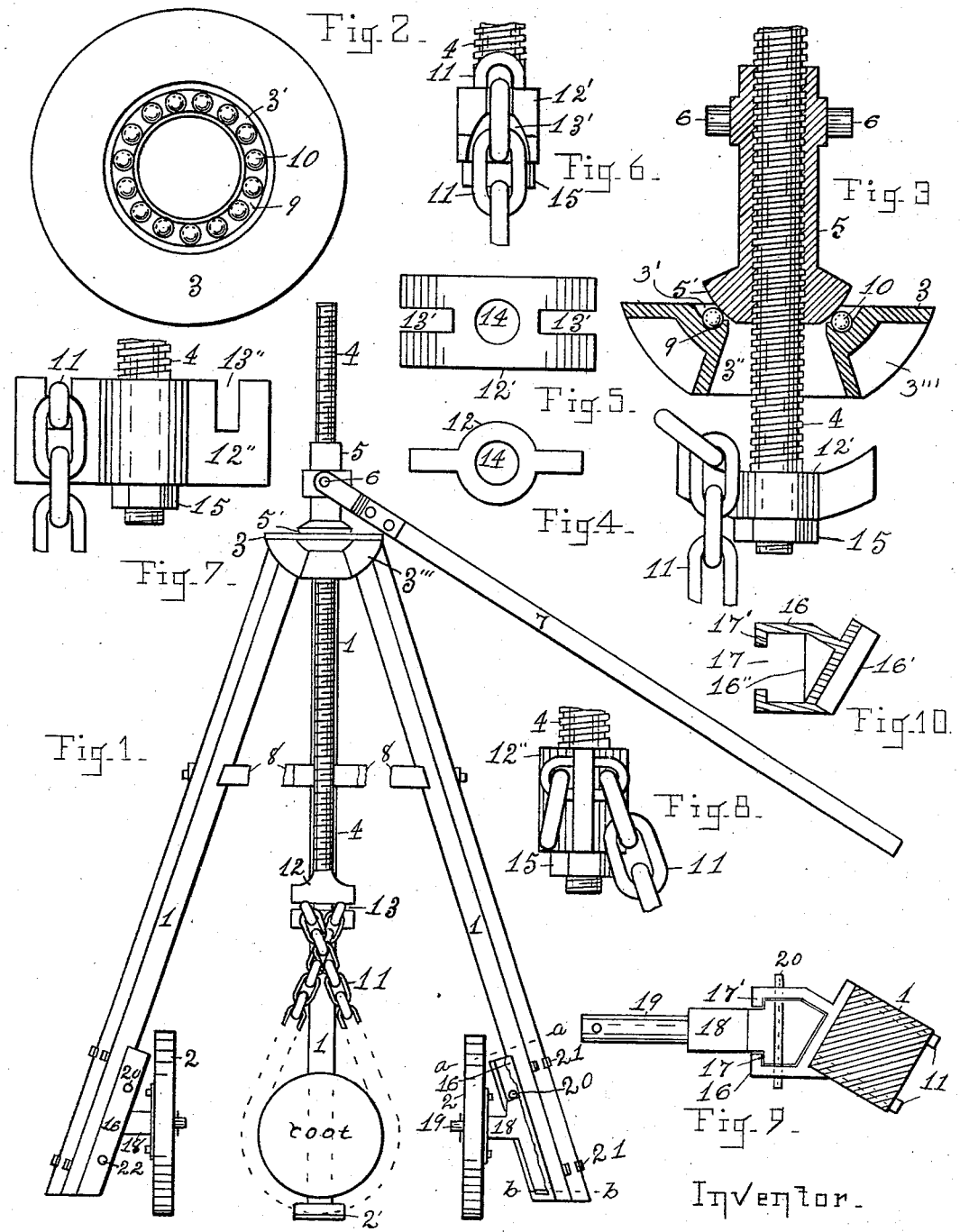

FRANK H. DEAN, OF SEYMOUR, WISCONSIN.

STUMP-PULLER.

SPECIFICATION forming part of Letters Patent No. 572,598, dated December 8, 1896.

Application filed March 11, 1896. Serial No. 582,790. (No model.)

*To all whom it may concern:*

Be it known that I, FRANK H. DEAN, a citizen of the United States, and a resident of Seymour, in the county of Outagamie and State of Wisconsin, have invented a new and useful Improvement in Stump-Pullers, of which the following is a specification.

My invention relates to a class of stump-pullers in which the lifting power is obtained from a screw and nut, the nut being supported at some distance from the ground upon a cap-piece which is carried upon a tripod, and a screw being arranged vertically in the nut and depending between the legs of the tripod, a chain being connected to the lower end of the screw for connection with the stump, and the stump being raised by the use of a horse which is hitched to an arm or sweep which extends outward and downward from the nut, the horse traveling around the stump-puller and turning the nut, whereby the screw is raised and with it the stump. In order that the screw in lifting the stump may be easily arranged in a line which is parallel with the line of draft, it is essential that the nut is so mounted as to rock a limited amount in any direction. This is the usual construction of this style of stump-pullers; and my improvement consists in introducing a number of balls between the lower end of the nut and its seat upon the cap-piece for reducing the friction of the nut upon the cap-piece both during this rocking motion of the nut and its revolution around the screw.

It also consists in a novel manner of connecting the chain and screw, and, furthermore, in the arrangement and adjustment of truck-wheels for moving the stump-puller from one stump to another, as will be hereinafter explained.

My invention is illustrated in the accompanying drawings, of which—

Figure 1 is an elevation of a stump-puller embodying my invention. The following figures are upon an enlarged scale. Fig. 2 is a plan of the cap-piece. Fig. 3 is a vertical section of the cap-piece, the nut, the lower end of the screw, and one modification of a clutch and a few links of the lifting-chain therein. Fig. 4 is a top view of a modification of the clutch as shown in Fig. 1. Fig. 5 is a top view of the clutch as shown in Fig. 3. Fig. 6 is an end view of said modification, chain-links therein, and the lower end of the screw. Fig. 7 is a side view of another modification of the clutch, chain-links therein, and the screw end. Fig. 8 is an end view of said modification, links, and screw. Fig. 9 is a top view of the truck-axle holder with the axle-shank therein as it appears when looking downward from the line $a\ a$ of Fig. 1, and Fig. 10 is a horizontal section of said holder upon the line $b\ b$ of Fig. 1.

Similar numerals indicate like parts in the several views.

1 indicates the legs of the tripod, upon which the mechanism for pulling the stumps is supported; 2, truck-wheels upon two of the legs; 2', a shoe upon the third leg; 3, the cap-piece; 3', its bowl-shaped upper end; 3'', its outward-flaring lower end; 3''', sockets in the cap-piece for receiving its supporting-legs; 4, the screw; 5, its nut; 5', the globular lower end of the nut; 6, trunnions which project from the barrel of the nut for the attachment of a sweep or arm 7, to the lower end of which a horse can be attached for raising the screw; 8, braces which are connected from one leg to another for giving stability to the upper part; 9, a circular groove around the inside of the bowl; 10, spherical balls arranged to roll around within said groove; 11, the stump-lifting chain; 12 12' 12'', modifications of a clutch for connecting the lifting-chain to the screw; 13 13' 13'', slots in said modifications, respectively, for holding a link of the lifting-chain therein; 14, a hole in the clutch-iron for the entrance of the end of the screw; 15, a nut upon the end of the screw; 16, a casting which is bolted upon the lower end of two of the legs 1 and contains a groove 17, in which the axle-shank 18 is fitted to slide up and down the leg; 16', a ledge which projects from the piece 16 under the leg as a seat for the leg to rest upon; 16'', a ledge which extends across a part of the groove 17 at its lower end, both for a web for strengthening the casting and for a stop for preventing the axle-shank from dropping through the lower end of said groove; 19, the axle of the wheel; 20, a rod or pin which is passed through the sides of the piece 16 and the slot 17 for holding the axle-shank at the desired elevation; 21, bolts for connecting the castings 16 to the leg.

The cap-piece 3 consists of a centrally-perforated metallic casting having a bowl-shaped upper end 3', a downward and outward flaring lower end 3", and sockets 3''' for receiving the three legs for its support. The lower end is flared for allowing the screw to swing to the right or left, as the line of draft upon the stump or its root may require, and its bowl is provided with a groove for receiving the balls 10. The grooves may be of any form which is adapted for the balls and the balls of any suitable and uniform size.

The nut consists of an internally-threaded barrel having trunnions 6 and a globular lower end 5', the latter part being of such a form as will allow it to bear upon the balls for its revolution thereon, and also for the screw to assume a slanting position, as the point of its connection with the stump may demand.

The cap-piece, the grooves therein, the balls, and the nut having its lower end of a suitable form for resting upon the balls within the groove of the bowl being assembled into their respective positions, the nut will be free to turn around easily upon its seat and to assume such a position, when the machine is suitably placed, as the particular stump to be lifted may require, and the friction of the nut upon its seat when it is being revolved around the screw and in positions of a varying degree of slant relative to the cap-piece will be greatly reduced below that of stump-pullers of the usual construction.

I am aware that balls have been used for lessening the friction of the nut upon its seat in a stump-puller, which I do not claim, broadly, but I am not aware of the nut and its globular lower end being made integral and said globular end being arranged for revolution upon balls, as herein shown and described.

The clutch upon the lower end of the screw to which the chain for lifting the stump is to be attached consists of a metallic piece having a slot arranged upon two opposite sides of the screw, which are adapted to permit a chain-link to enter it flatwise from its outer end, but is not wide enough to allow the adjoining link, which will necessarily be arranged across the slot, to be drawn through it.

The sides of the slot may be arranged to project from the screw horizontally, one over the other, as in Fig. 1, be side by side in a horizontal plane, as in Figs. 3, 5, and 6, or be vertically arranged, as in Figs. 7 and 8. In either case a link can be entered "flatwise," and, a strain being placed upon it from the direction of the body of the chain, the adjoining outer link's flatwise position being transversely of the slot, no amount of strain in a direction parallel with the screw will pull the link through said slot. In practice, however, the strain upon the chain is not usually parallel with the screw, but diverges from it to the right or left. In this case for preventing the link from being pulled out of the open end of the slot when the form shown in Fig. 1 is used it is advisable to cross the chains, as shown in said figure, and with the form of Figs. 3, 5, and 6 the outer ends of the fingers or sides of the slot should be turned upward, but with that shown in Figs. 7 and 8 a pull downward at any angle with the screw less than a right angle will not pull the link from the slot. The clutch may be integral with the screw, as shown in Fig. 1, or be attached to it in any secure manner, as with a nut, as shown in Figs. 3, 6, 7, and 8. With this device for connecting chain and screw there is no unnecessary weight in hooks or toggles, and every inch of its length is made available for lifting purposes.

For convenience in moving the machine from one stump to another two of its legs are provided with truck-wheels and the third or forward leg with a shoe. These wheels are mounted upon short axles which are arranged at such an angle with the legs that the wheels will run in parallel lines and revolve in vertical planes. They are shown in Fig. 1, and a top view of the right-hand leg, its axle, and axle-holder as they appear in looking downward from the line $a\ a$ of Fig. 1 is shown in Fig. 9.

The wheels are arranged to revolve upon short axles 19, which are projected from a sliding axle holder or shank 18, said holder being arranged for movement lengthwise of the leg and within the socket 17, it being held within said socket by the gibs 17'. In using the machine, and especially upon soft ground, the legs will penetrate the soil. For overcoming this difficulty I cut the legs upon their lower ends upon an angle for fitting the ground and form the lower ends of the socket-pieces 16 the same angle, and also form upon each lower end a ledge 16' and opposite it the ledge 16'', the former for a support for the foot of the leg and the latter as a strengthening-web for the socket, a bearing-surface upon the ground, and a stop for preventing the axle-shank from passing out of the lower end of the socket. These socket-pieces thus form additional bearing-surface under the legs under which to block up when required and make the placing of a plank under the legs upon level ground, excepting upon exceedingly soft ground, unnecessary.

The position of the wheels when moving the machine is as shown in Fig. 1, their lower circumference being below the ends of the legs, but after it is placed in position for pulling the stump the wheels are raised by sliding their axle-shanks upward within their sockets and letting the legs rest upon the ground. The axle-shanks are held at the desired height relative to the legs by means of a rod 20, which being inserted through the groove, as in Fig. 9, above the axle-shank will cause the weight upon said legs to be carried upon the wheels, but upon withdrawing the rod the legs will fall to the ground, and the shanks may be raised within the grooves and the wheels held clear of the ground by inserting the rod under the shanks through the hole 22.

Other forms of the axle-shank holder, consisting of a groove within which the axle-shank is arranged to slide and be held at various heights by a rod across the groove, as here shown, I consider as within the scope of my invention and may be used instead of the particular form here shown.

Having described my invention, what I claim, and desire to secure by Letters Patent, is—

A truck device for a three-legged stump-puller, consisting of a socket-piece provided with an angular gibbed slot arranged lengthwise of a leg, said piece bolted thereto and having a projecting ledge at its lower end for supporting the lower end of said leg, and also a ledge across a part of said slot at its lower end, in combination with an axle-shank adapted for sliding within and lengthwise of said slot, said shank having an axle end extending outward therefrom and a wheel mounted for revolution upon said axle, said shank being arranged for movement lengthwise of said slot and for being held at predetermined points in said lengthwise movement, substantially as described.

FRANK H. DEAN.

Witnesses:
 J. DEAN,
 JOHN REIS.